Figure 2:
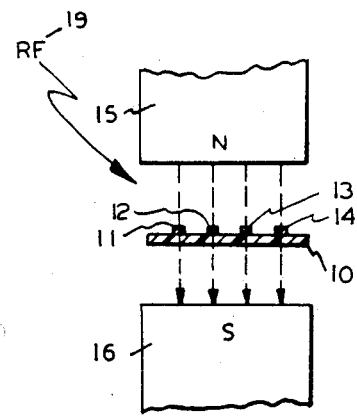

Sept. 10, 1968   F. O. RICE   3,401,391
PROCESS OF RECORDING MICROWAVE FREQUENCY SIGNALS
ON A MEDIUM COMPOSED OF DIVERSELY SENSITIVE
SPIN RESONANT MATERIALS AND ARTICLE
Filed Nov. 20, 1962

INVENTOR
FRANCIS OWEN RICE

BY *Paris, Haskell & Heirne*

ATTORNEYS

United States Patent Office 3,401,391
Patented Sept. 10, 1968

3,401,391
PROCESS OF RECORDING MICROWAVE FREQUENCY SIGNALS ON A MEDIUM COMPOSED OF DIVERSELY SENSITIVE SPIN RESONANT MATERIALS AND ARTICLE
Francis Owen Rice, Washington, D.C., assignor to Litton Systems, Inc., College Park, Md.
Filed Nov. 20, 1962, Ser. No. 239,094
17 Claims. (Cl. 346—1)

This invention relates generally to improvements in recording of radio frequency signals, including the microwave band of frequencies, and is particularly concerned with directly recording spectral frequency images of the radio frequency signals, and with improvements in the recording tape or other medium for such purposes.

In an earlier copending application of the same assignee, S.N. 59,342, filed Sept. 29, 1960, now Patent No. 3,238,511, there is disclosed processes for directly recording high frequency signals by applying the signals to a frequency sensitive resonant recording medium, such as a tape or record containing free radical material, and concurrently tuning the free radicals into energy absorptive relationship with the beam by means of an externally produced intense magnetic field. Among the processes and apparatus disclosed, there is shown the direct recording of a spectral frequency image of the signal by selectively tuning different positions on the record to different component frequencies in the signal by the use of a nonuniform or nonhomogeneous magnetic field.

In these recording processes, energy obtained from the high frequency signal is absorbed by the frequency tuned spin resonant material and converted into the form of heat, optical change or other type of energy and the resulting heat image, optical image or other form of energy image being obtained is subsequently employed in connection with a heat or light sensitive record to effect either a permanent or temporary recording image of the signal as may be desired for the application intended. The spin resonant materials are also disclosed, in one form, as being embodied on an elongated tape or record which may have different portions along its length successively imposed to the radio frequency signal in timed sequence to provide a series of spectral frequency images of the signal in a manner generally comparable to the taking of a successive series of optical photographs of a varying light pattern.

According to the present invention, a different manner of recording a frequency spectrum image of the radio signal is obtained by simultaneously applying the signal to a series of differently characterized resonant materials. These differently characterized recording materials may be tuned in common by a uniform magnetic field to selectively respond to different frequencies in the signal and provide a frequency spectrum image of the signal or alternatively, the different materials may be tuned by a nonhomogeneous magnetic field or nonuniform field to increase or decrease the frequency bandwidth of recording, to selectively record only given frequency bands, to provide different frequency response characteristics in several parts of the same band, or to obtain other variations in the recording as may be desired.

It is accordingly a principal object of the invention to provide improved processes and recording mediums for directly recording a frequency spectrum image of a high frequency signal, including the micro-wave band of frequencies.

A further object is to provide a process for simultaneously recording different frequencies in the signal at different positions in the recorded image.

Another object is to provide such processes employing a uniform magnetic field for frequency selective tuning of the recording medium.

A still further object is to provide processes for varying the frequency bandwidth of the recording medium either uniformly, nonuniformly, or in other desired fashion.

Still another object is to provide an improved recording member that directly responds to a high frequency radio signal to record a frequency spectrum image thereof.

Figure 3:
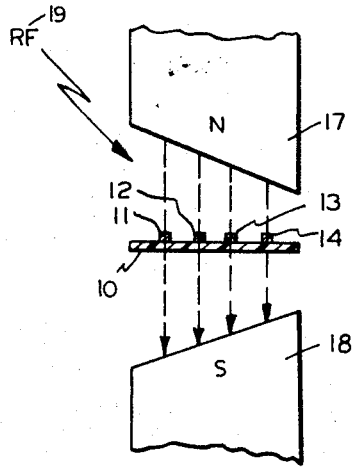
Figure 4:
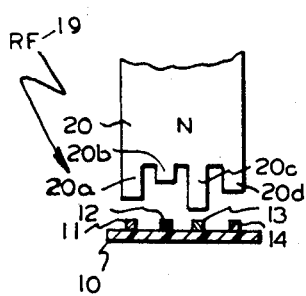
Figure 5:
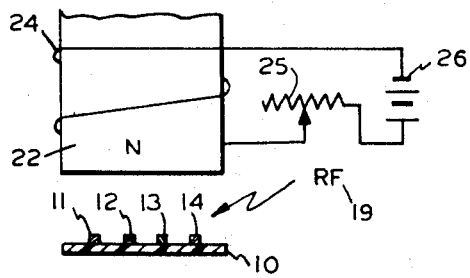
Figure 6:
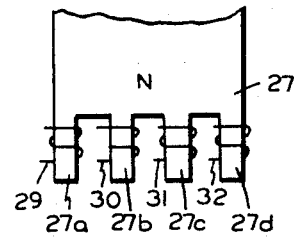
Figure 1:
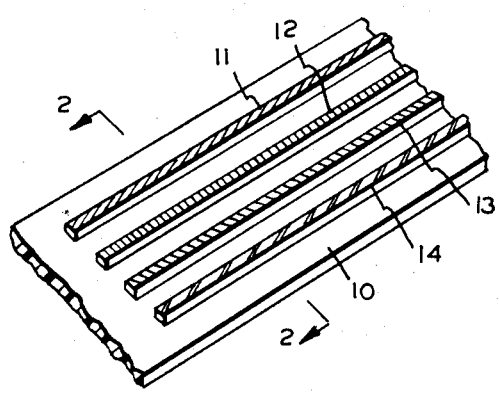

Other objects and many additional advantages will be more readily understood by those skilled in the art after a detailed consideration of the following specification taken with the accompanying drawing, wherein:

FIG. 1 is a perspective view illustrating one frequency discriminative recording tape that may be employed according to the invention, FIG. 2 is a cross sectional view of the recording tape of FIG. 1 and illustrating one manner of frequency tuning this tape by means of a uniform magnetic field, FIG. 3 is a cross sectional view similar to FIG. 2, and illustrating the tuning of this recording tape by means of a nonuniform magnetic field, FIG. 4 is a cross sectional view, similar to FIGS. 2 and 3, and illustrating a different manner of selectively tuning the recording tape by a nonuniform magnetic field, FIG. 5 is a cross sectional view similar to FIG. 2, and illustarting one manner of adjustably varying the frequency bandwidth of the recording, and FIG. 6 is a cross sectional view, similar to FIG. 2, and illustrating one manner of selectively varying the frequency bandwidth of recording and/or the selective frequency response to different individual frequencies in the radio signal.

Referring now to the drawings there is shown in FIG. 1, one form of a recording tape that may be employed according to the invention to provide a recording of an image directly from a radio frequency signal or radiant radio beam. As shown the recording tape may comprise a web or base 10 of suitable rigid or flexible material such as the known tape base, Mylar, upon which is coated or otherwise supported a plurality of separate rows of differently characterized spin resonant materials 11, 12, 13, and 14 located in spaced side-by-side relationship along the length of the base, as shown.

As is more fully discussed in said earlier application, the class of spin resonant materials that may be employed are various types of materials that are characterized as being absorptive of radio frequency energy directly from a varying magnetic field or an electromagnetic field. These materials are frequency responsive and may be tuned or rendered selectively resonant to different frequencies in the signal by the application thereto of an externally produced static magnetic field. Among the many known materials of this type, the class of free radical materials have been found particularly suitable in having a sharp resonant frequency, and, in this class, the free radical diphenylpicyralhydrazyl has been one of these used and found suitable.

The frequency of resonance of such materials is calculated from the formula $$v = g\beta H/h$$

where $v$ is the frequency at which the material is resonant,

H is the value of the externally applied tuning magnetic field, stated in terms of gauss, and which may be varied to change the resonant frequency, $g$ is the "Spectroscopic splitting factor," for that material, more often called the $g$-value, $\beta$ is the constant for all materials and termed the Bohr magneton equal to $0.92731 \times 10^{-20}$ erg gauss$^{-1}$, and $h$ is also a constant for all materials and known as Planck's constant, equal to $6.62517 \times 10^{-27}$ erg sec.

It is noted in this formula that only the $g$-value is a variable quantity related to the characteristic peculiar to the material employed, since both factors $\beta$ and $h$ are constant for all materials and the parameter H is dependent upon the amplitude of the externally applied tuning magnetic field. As a general rule, many different spin resonant materials possess the same or substantially the same $g$-value. For example, in the class of free radical materials referred to above, most of the known free radicals have $g$-values that lie within the narrow range of ½% of the number 2.0023. However, there are exceptions to this general rule and some of the known free radical materials deviate from this narrow range, such as the free radical material ultramarine which possesses a higher $g$-value of 2.0286.

According to the present invention this varying $g$-value characteristic that is associated with different known spin resonant materials is employed to provide a novel type of frequency selective recording medium and processes employing this medium for directly recording spectral frequency images of a radio frequency signal.

According to the invention, each of the different rows of material 11 to 14 on the tape in FIG. 1 is comprised of a different spin resonant material having a different $g$-value than that of the other rows whereby when the tape 10 is placed in a uniform magnetic field as in FIG. 2, where it is located between the uniformly spaced poles 15 and 16 of a magnet, each of the different rows of material 11 to 14, is tuned by the uniform magnetic field to selectively resonate at a different frequency of the radio signal.

When a spatial region or frame on the tape 10, including the four rows 11 to 14, is illuminated by a varying magnetic signal or a radio signal 19 containing different frequency components, each of the rows 11 to 14, inclusive, then selectively responds only to a given different frequency component of the beam at which it is resonant to record only that frequency component. In this manner, each of the various frequency components in the signal 19 is separated from the others on the recording tape 10, with each different frequency component being recorded at a different row on the tape that is responsive thereto to provide a frequency spectrum image of the signal 19.

As one example of the above, let it be assumed that the row 11 on the tape is comprised of a first free radical material which possesses a $g$-value of 2.0030; the row 12 is comprised of a different material having a $g$-value of 2.0036; the row 13 is comprised of a third material having a $g$-value of 2.0042; and finally the row 14 is of a fourth material having a $g$-value of 2.0286. If this tape 10 is then placed in a homogeneous static magnetic field, as in FIG. 2, having an intensity of 3,000 gauss, the first row 11 is selectively tuned to resonate at a frequency of about 8.411 megacycles; the row 12 is tuned to resonate at about 8.413 megacycles; row 13 to resonate at about 8.415 megacycles; and row 14 to resonate at about 8.522 megacycles. Consequently, when a region across the tape 10 including all four rows is then directly illuminated by a radio frequency signal 19 having one or more of these frequency components, each of the different frequency components in the beam corresponding to these resonant frequencies is then imaged or recorded only at that one of rows 11 to 14, inclusive, that is selectively resonant to that frequency.

For increasing the recording bandwith or frequency spread between the rows 11 to 14, inclusive, the tape 10 may alternatively be subjected to a non-homogeneous magnetic field as shown in FIG. 3, where the tape 10 is placed between progressively divergent magnetic poles 17 and 18. In this case the row of material 14 being located between the more closely spaced regions of the magnet poles and near one edge of the tape, receives a more intense magnetic field than does the row of material 11 being located between the more separated pole regions near the other edge of the tape 10. If the $g$-value of material 14 is also greater than that of material 11, as in the example listed above, the respective frequencies at which the two materials 11 and 14 resonate will be more widely separated according to the respective products of $g$ and H. Similarly the resonant frequencies of the other rows of materials 12 and 13 will also be more widely separated from each other and from that of materials 11 and 14 for the same reason; namely, that the $gH$ products will be more widely separated.

FIG. 4 illustrates another manner of changing the frequency discrimination being provided by the rows of materials 11 to 14, inclusive, in a nonuniform predetermined manner for such diverse purposes as the recording of frequency codes or other forms of intelligence. As shown, each of the rows 11 to 14, inclusive, in this embodiment is subjected to a different preselected magnetic field by providing projecting magnetic poles of different lengths 20a to 20d, inclusive, extending from the pole faces of magnet pole 20. In this manner, the magnetic field H being applied to each of the rows 11 to 14, inclusive, is preselected to individually tune that row of material to a particular frequency desired.

For individually varying the magnetic tuning field for each row of resonant material, the alternative magnet construction of FIG. 6 may be employed. In this construction, each of the individual projecting magnet poles 27a to 27d, inclusive, of the magnet 27, confronting a different row on the tape is provided with a separately energizable electromagnet winding 29 to 32, inclusive, to enable individual adjustment or variation of the magnetic field being applied to each row of resonant material.

If the tape 10 should be of narrow width, and the rows of resonant material are positioned closely together on the tape 10, then the projecting magnetic poles in FIGS. 4 and 6 may be terminated at pointed ends (not shown) that are each aligned above its corresponding row for focusing or concentrating the desired magnetic field on that row.

FIG. 5 illustrates one manner of uniformly shifting the bandwidth of recording while maintaining the frequency separation between the resonant rows substantially constant. As illustrated, this is performed by providing a homogeneous magnetic field, being supplied by uniformly spaced magnetic poles 22 and 23, as shown, but varying the intensity of this homogeneous field by means of a single electromagnet winding 24. The current through winding 24 is made variable to change the magnetic field by adjusting the variable resistor 25 located in series circuit relationship with the winding 24 and with a potential source 26. Since the magnetic field applied to all rows in common is always uniform, the adjustment of the intensity of this field shifts the bandwidth response of all rows on the recording tape but the frequency separation between the rows remains constant. This result may also be obtained in the alternate embodiment of FIG. 6 by energizing all of the windings 29 to 32 in common.

The $g$-values of different spin resonant materials are known, and are extensively set forth in the published literature. For further information as to free radical containing materials, one textbook reference where such information will be found is "Free Radicals as Studied by Electron Spin Resonance" by D. J. E. Ingram, published by the Philosophical Library, New York, N.Y.

Among the numerous paramagnetic materials, these $g$-values will be found to vary over a range of from 1 to 6 or more.

Typical spin resonant materials having different $g$-values that may be employed in practicing the invention are set forth below. This list should not be considered as being comprehensive of all such materials that may be employed according to the invention but merely a limited number of those found suitable in practicing the invention.

| A | g-Value |
|---|---|
| Diphenylpicrylhydrazyl | 2.0036 |
| Beta-[phenyl-nitrogen oxide]-beta methyl pentane (1) | |
| N-phenyl ether | 2.0057 |
| Di-p-anisyl nitric oxide | 2.0063 |
| Ultramarine | 2.0286 |

[1] σ-One oxime-.

Although in the illustrated embodiment, the recording medium is disclosed as a recording tape having a number of parallel arranged rows of different g-value spin resonant materials being disposed along its length, it is believed evident that the different spin resonant materials may be otherwise supported on or combined with base mediums having any desired configuration, pattern, or shape, either continuous or discontinuous in nature. It is further evident that such recording medium may be tuned into resonance with the radio signal by differently configured homogeneous or nonhomogeneous magnetic fields, being produced by either permanent magnets or electromagnetic field generators in any desired intensity pattern compatible with the recording process desired. Since these and many other modifications and variations will be suggested to those skilled in the art without departing from the spirit and scope of this invention, the invention should be considered as being limited only according to the following claims appended hereto.

What is claimed is:

1. A method of recording a frequency spectrum of a radio frequency wave comprising:
   disposing a plurality of differently characterized resonant materials at different positions over a spatial region and subjecting said materials simultaneously to a uniform magnetic field to tune the materials selectively into energy absorptive relationship with different frequencies of the radio frequency wave, and exposing said materials directly to the wave.

2. A method for recording a frequency spectrum of a high frequency electromagnetic wave comprising:
   producing a record member having a plurality of resonant materials of different g-value separated from one another on the record,
   nonuniformly tuning said different materials into resonant absorptive relationship with different frequencies of an electromagnetic wave by applying to said different materials a static magnetic field of the same intensity, and
   exposing said materials directly to the wave.

3. A method for producing a frequency discriminative recording medium capable of responding at different positions on the medium to different frequencies of a radio beam comprising:
   providing a series of different resonant materials at separated positions over a spatial region, each of said materials being characterized as being absorptive of radio frequency energy at a different radio frequency when exposed to a magnetic field of the same intensity, and
   subjecting said region of the medium to a non-uniform magnetic field thereby to render said different materials further discriminative of different radio frequencies.

4. A process for directly recording radio frequency waves comprising the steps of:
   spatially dispensing different spin resonant material having different g-values on a record base,
   tuning said materials into energy absorptive relationship with different frequency radio frequency waves by subjecting said base to a homogeneous magnetic field, and
   illuminating said base by the radio frequency wave.

5. A frequency discriminative recording member for radio frequency waves comprising:
   an elongated member having different spin resonant materials disposed at different spatial positions on the member, said resonant materials being characterized as absorptive of radio frequency energy when exposed to a magnetic field oriented transversely to the H component of the radio frequency wave, said different spin resonant materials being further characterized as possessing different g values, whereby said different materials are frequency selective when exposed to a homogeneous magnetic field.

6. In a method of recording a frequency spectrum of a radio frequency signal, the steps of:
   spacing a plurality of spin resonant materials to occupy different spatial positions,
   said materials being absorptive of radio frequency energy at different resonant frequencies,
   applying a magnetic field to said materials to frequency tune said materials into energy absorptive relationship with predetermined radio frequencies, whereby at each of said different spatial positions, the material is selectively rendered absorptive to only a predetermined frequency,
   and applying the radio frequency signal to all of said positions whereby the predetermined frequency components of said signal are selectively absorbed at said different positions.

7. In the method of claim 6, the additional step of controllably changing the magnetic field to shift the bandwidth of frequencies to be recorded.

8. In the method of claim 6, the additional step of selectively varying the magnetic field at the different positions to selectively vary the frequency response at said different positions.

9. In the method of claim 6, the step of applying a magnetic field to said materials being performed by focusing a magnetic field of preselected intensity at said different spatial positions, which field has a different intensity than the magnetic intensity existing in between said positions.

10. In the method of claim 6, said magnetic field being nonhomogeneous with respect to said different positions.

11. In the method of claim 6, said magnetic field being nonhomogeneous with respect to said different positions, and being adjustably variable to shift the frequency response at said different positions.

12. In the method of claim 6, said magnetic field being of progressively increasing intensity at each of said positions in proportion to the spacing between said positions, and being adjustably variable to shift the bandwidth of frequencies to be recorded.

13. A frequency sensitive recording medium for radio frequency signals comprising:
   a support member,
   a plurality of different spin resonant materials supported by said member at different spatial positions,
   said different materials being characterized as selectively absorptive of different radio frequency signals when tuned by a homogeneous magnetic field.

14. A radio frequency separator occupying a spatial region and responding at different positions in said region to different radio frequencies comprising:
   a plurality of different spin resonant materials, each occupying a different position in said spatial region,
   each of said resonant materials characterized as being selectively absorptive to a different frequency radio signal when subjected to a tuning magnetic field of the same intensity.

15. In the frequency separator of claim 14,
   magnet means including a series of projecting poles with said poles disposed over said spatial region to provide a preselected magnetic field at said different spin resonant materials, thereby to selectively tune said materials into energy absorptive relationship with preselected radio frequency signals.

16. In the separator of claim 15, means for individually varying the magnetic field at different ones of said magnetic poles.

17. In the separator of claim 15, said magnet means comprising a unitary magnet having said projecting poles integral therewith.

References Cited

UNITED STATES PATENTS 2,822,427  2/1958  Atkinson et al. ____ 179—100.2
2,952,503  9/1960  Becker _____ 333—24.1

BERNARD KONICK, *Primary Examiner.*

J. B. BREIMAYER, *Assistant Examiner.*